United States Patent
Hoshino et al.

(10) Patent No.: US 10,057,909 B2
(45) Date of Patent: Aug. 21, 2018

(54) TERMINAL, BASE STATION, TRANSMISSION METHOD, AND RECEPTION METHOD

(71) Applicant: Panasonic Intellectual Property Corporation of America, Torrance, CA (US)

(72) Inventors: Masayuki Hoshino, Kanagawa (JP); Ayako Horiuchi, Kanagawa (JP); Seigo Nakao, Singapore (SG)

(73) Assignee: Panasonic Intellectual Property Corporation of America, Torrance, CA (US)

(*) Notice: Subject to any disclaimer, the term of this patent is extended or adjusted under 35 U.S.C. 154(b) by 119 days.

(21) Appl. No.: 15/158,647

(22) Filed: May 19, 2016

(65) Prior Publication Data
US 2016/0270096 A1 Sep. 15, 2016

Related U.S. Application Data

(63) Continuation of application No. PCT/JP2015/000049, filed on Jan. 8, 2015.

(30) Foreign Application Priority Data

Jan. 22, 2014 (JP) ................. 2014-009508

(51) Int. Cl.
*H04W 72/08* (2009.01)
*H04W 48/16* (2009.01)
(Continued)

(52) U.S. Cl.
CPC ......... *H04W 72/085* (2013.01); *H04L 5/0048* (2013.01); *H04W 24/10* (2013.01);
(Continued)

(58) Field of Classification Search
None
See application file for complete search history.

(56) References Cited

U.S. PATENT DOCUMENTS

| | | | | |
|---|---|---|---|---|
| 2009/0227261 A1* | 9/2009 | Tiirola | .................. | H04W 16/10 455/450 |
| 2011/0092167 A1* | 4/2011 | Dottling | ................ | H04W 24/10 455/67.11 |

(Continued)

FOREIGN PATENT DOCUMENTS

WO 2013/040487 3/2013

OTHER PUBLICATIONS

International Search Report of PCT application No. PCT/JP2015/000049 dated Mar. 3, 2015.
(Continued)

*Primary Examiner* — Chi H Pham
*Assistant Examiner* — Shick Hom
(74) *Attorney, Agent, or Firm* — Seed IP Law Group LLP

(57) ABSTRACT

A reception processor receives the cell detection reference signals, each of the cell detection reference signals being transmitted from corresponding one of a plurality of cells. An RRM report generator generates measurement information indicating a measurement result of reception quality measured using the cell detection reference signal. A transmission processor transmits the measurement information. The cell detection reference signals are mapped to any one of a plurality of candidate resources, which is a part of a plurality of resources set for other reference signals in a subframe to which the cell detection reference signals are mapped.

14 Claims, 9 Drawing Sheets

(51) Int. Cl.
*H04L 5/00* (2006.01)
*H04W 24/10* (2009.01)
*H04W 72/04* (2009.01)
*H04W 88/08* (2009.01)

(52) U.S. Cl.
CPC ....... *H04W 48/16* (2013.01); *H04W 72/0446* (2013.01); *H04W 88/08* (2013.01)

(56) References Cited

U.S. PATENT DOCUMENTS

| | | | | |
|---|---|---|---|---|
| 2012/0044870 | A1* | 2/2012 | Mochizuki | H04B 7/024 370/328 |
| 2012/0142373 | A1* | 6/2012 | Kazmi | H04W 64/00 455/456.1 |
| 2013/0170454 | A1* | 7/2013 | Zhou | H04W 28/08 370/329 |
| 2013/0178220 | A1* | 7/2013 | Lee | H04L 5/0007 455/450 |
| 2014/0036812 | A1* | 2/2014 | Malladi | H04W 72/042 370/329 |
| 2015/0092582 | A1* | 4/2015 | Liao | H04J 11/005 370/252 |
| 2015/0163008 | A1* | 6/2015 | Kim | H04J 11/0069 370/252 |
| 2016/0143042 | A1* | 5/2016 | Nagata | H04W 16/02 370/329 |

OTHER PUBLICATIONS

3GPP TSG RAN WG1 Meeting, R1-133457, NTT DOCOMO, "Small Cell Discovery for Efficient Small Cell On/Off Operation" Aug. 2013.

3GPP TS 36.211 v11.4.0, "Evolved Universal Terrestrial Radio Access (E-UTRA); Physical channels and modulation (Release 11)" Sep. 2013.

* cited by examiner

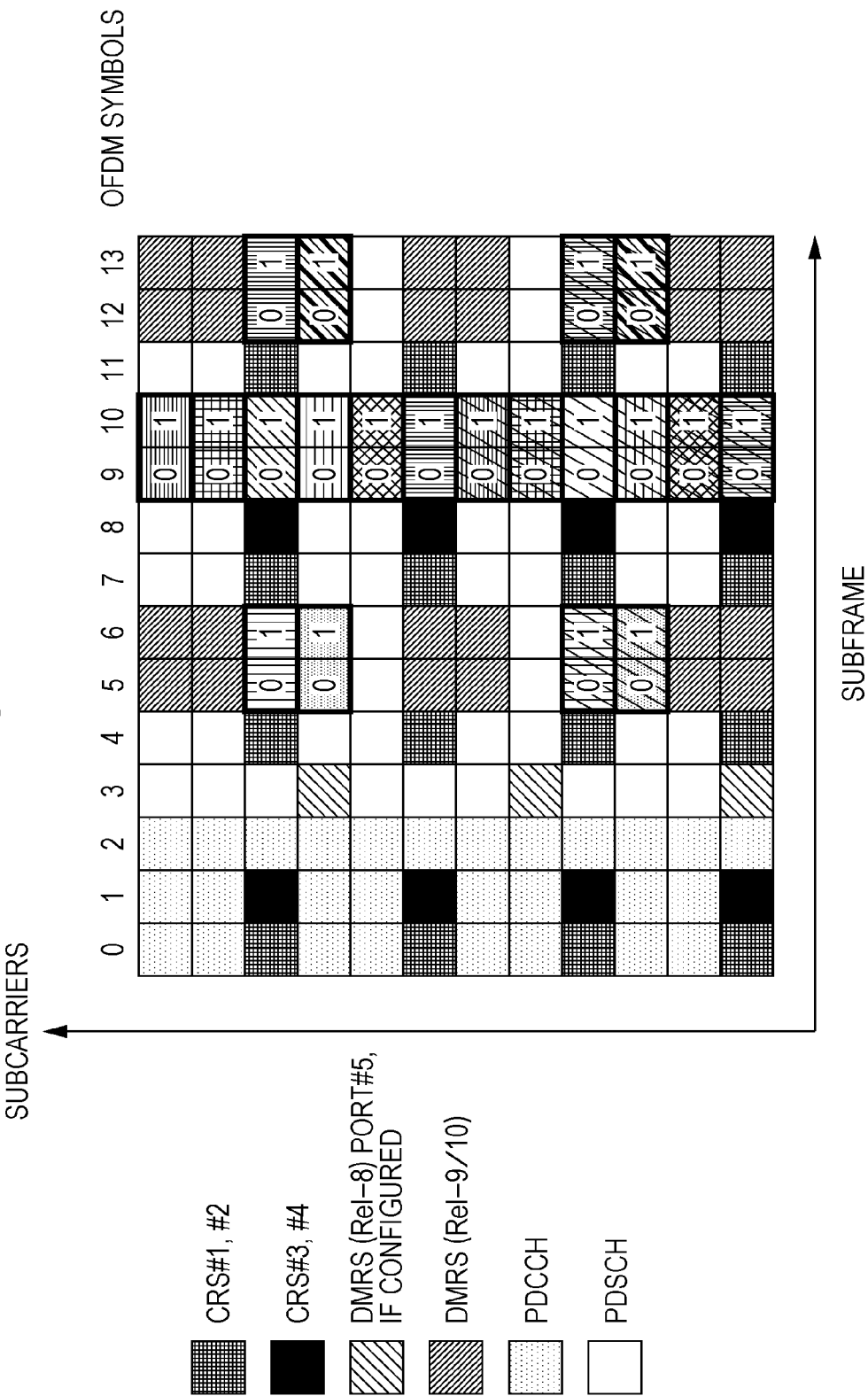

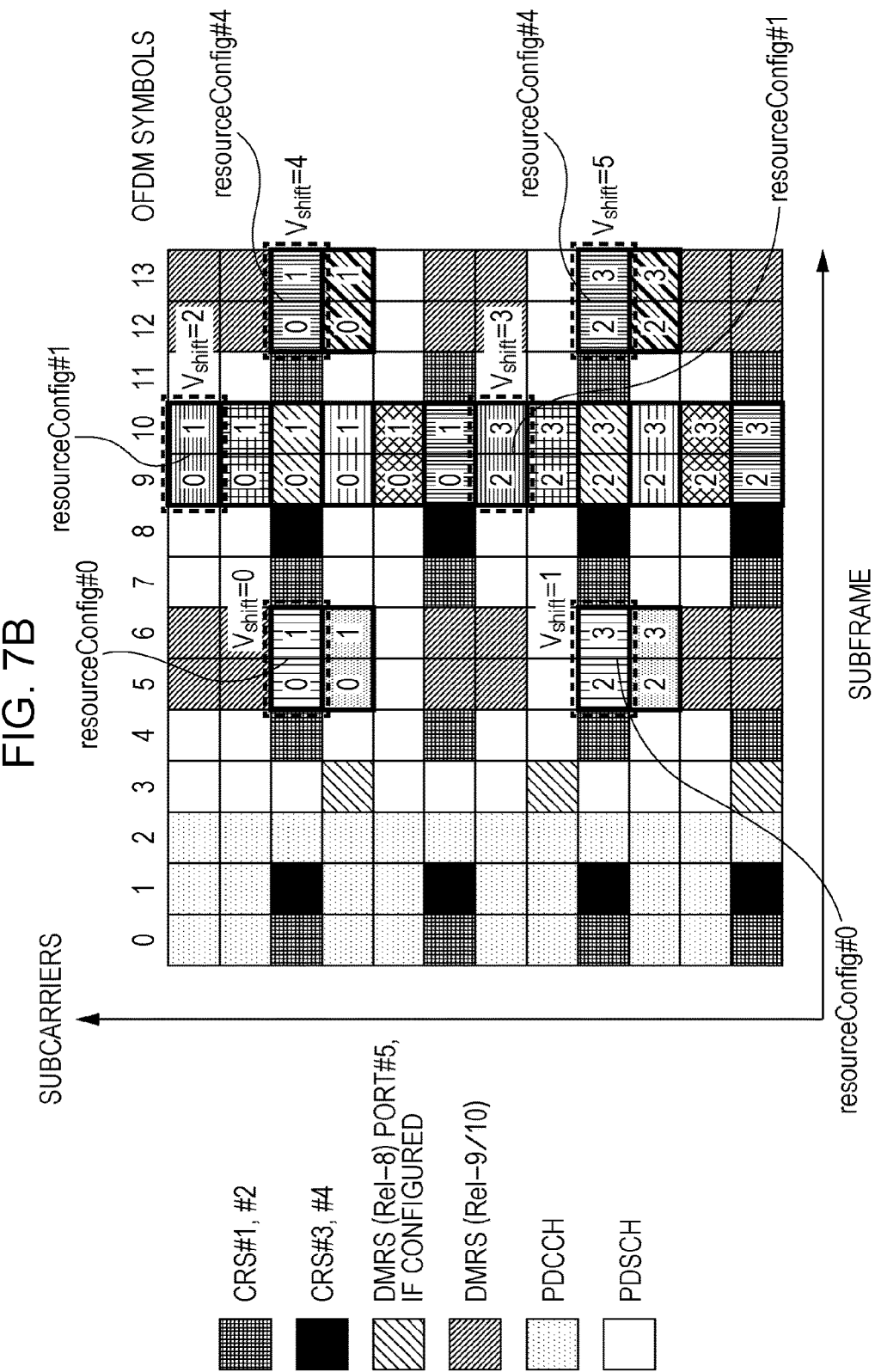

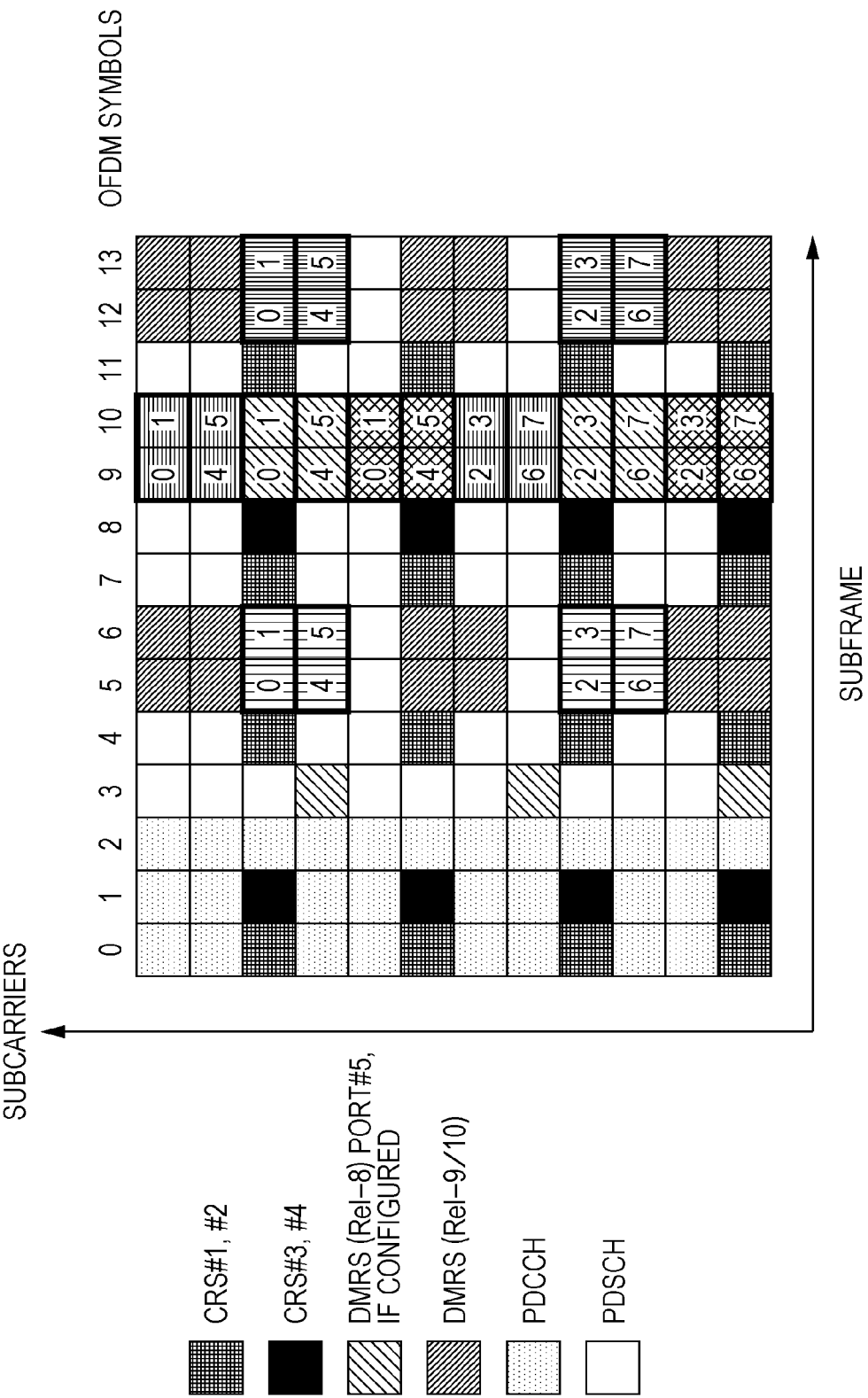

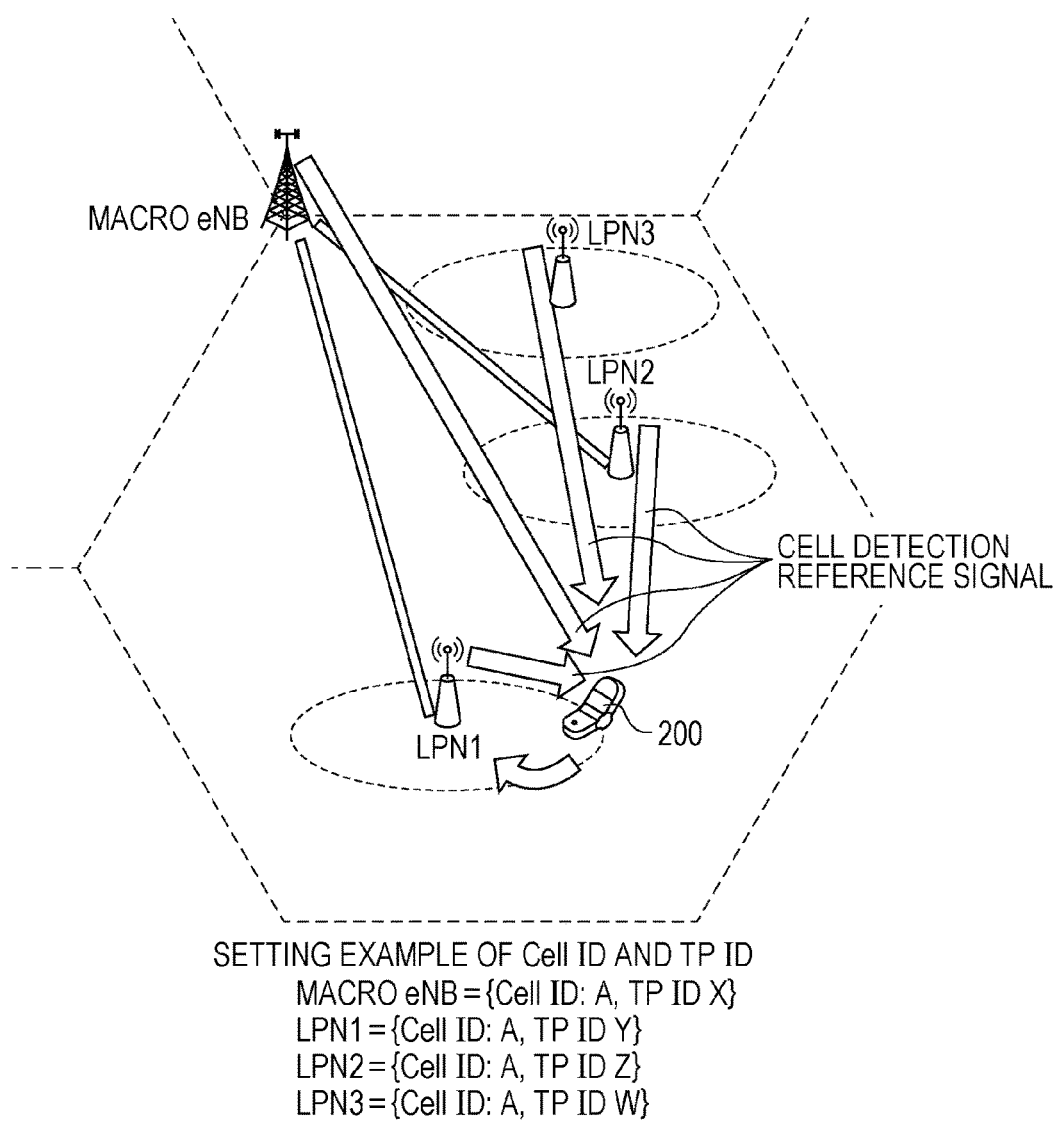

TERMINAL, BASE STATION, TRANSMISSION METHOD, AND RECEPTION METHOD

BACKGROUND

1. Technical Field

The present disclosure relates to a terminal, a base station, a transmission method, and a reception method.

2. Description of the Related Art

In an LTE-Advanced technique, which is further enhanced from a 3rd Generation Partnership Project Radio Access Network Long Term Evolution (3GPP-LTE; hereinafter, referred to as LTE), accommodating increased traffics as described below is considered. That is to say, in an area covered by macro cells that are base stations with high transmission powers (referred to as eNBs), small cells that are base stations with low transmission powers (referred to as low power nodes (LPN) in some cases) are arranged in high density.

For operating the high-density arrangement of small cells, control of the on state and the off state of the small cells is considered in order to suppress interference caused by the small cells and to reduce the power consumed by the small cells. When the small cells are in the off state, the small cells are in a "halt state" in which data is not allocated to a terminal (user equipment (UE)).

However, when transmission of all signals from a small cell is stopped, the terminal cannot detect the small cell any more. To prevent this, causing the small cell to transmit a cell detection reference signal (referred to as discovery signal in some cases) is considered so that the terminal can detect a small cell in the off state. The small cell transmits the cell detection reference signal to the terminal to cause a network to report a measurement result in the terminal. With this, a base station can appropriately set a cell connection of the terminal taking into account propagation path conditions between the terminal and the small cells or traffic conditions of each small cell.

The cell detection reference signal is a signal for performing cell detection in the terminal, time frequency synchronization, and measurements for radio resource management (RRM) of same frequencies and different frequencies when the small cell is in the off state. To suppress interference with the terminal and the power consumed by the small cell, the cell detection reference signal is desired to be transmitted from the small cell with long transmission intervals. Furthermore, for the measurements for RRM to be performed in the terminal, causing the transmission interval of the cell detection reference signal to be notified in advance from the network is considered.

The small cell in the off state transmits only the cell detection reference signal and does not transmit any other signals. Therefore, an existing terminal (legacy UE supporting the standard specification for Rel. 11 or before, for example) cannot use the cell detection reference signal for the measurements for RRM. By contrast, a new terminal (UE supporting the standard specification for Rel. 12, for example) responds to the measurements for RRM using the cell detection reference signal for the purpose of enhancement of small cells, and thus can observe the cell detection reference signal. Furthermore, the small cell in the on state transmits the cell detection reference signal together with synchronization signals (primary synchronization signal (PSS)/secondary synchronization signal (SSS)) or cell specific reference signal (CRS). With this, the existing terminal and the new terminal both can observe a signal.

Furthermore, as a configuration of the cell detection reference signal, changing the cycle, the band (that is, time and frequency resources), and the like of a signal already present in an LTE-Advanced system for use is considered. As a candidate signal used as a cell detection reference signal, a positioning reference signal (PRS), a channel state information-reference signal (CSI-RS), a reduced PSS/SSS+CRS, and the like are cited (see 3GPP TSG RAN WG1 meeting, R1-133457, NTT DOCOMO, "Small Cell Discovery for Efficient Small Cell On/Off Operation", August 2013, for example).

As an example, a case where the CSI-RS is applied for the cell detection reference signal will be herein described.

The CSI-RS is a signal introduced for the purpose described below. A terminal uses the CSI-RS to observe channel information from a base station to the terminal and generates a feedback signal in accordance with the observed value to report to the base station. The base station performs adaptive modulation, precoding control, or the like based on the feedback signal. The CSI-RS is defined in a configuration corresponding to a maximum 8-port transmission antenna of the base station (see 3GPP TS36.211v11.4.0 (2013-09), "Evolved Universal Terrestrial Radio Access (E-UTRA); Physical channels and modulation (Release 11)", September 2013, for example). More specifically, the CSI-RS is defined in each of configurations for 8 ports, 4 ports, and 2 ports in accordance with the number of the transmission antenna ports of the base station.

SUMMARY

When simply combining existing reference signals such as a CSI-RS as a cell detection reference signal, a problem as described below arises. Specifically, in order to improve the detection accuracy of a cell detection reference signal in a terminal, the resource for transmitting the cell detection reference signal is desirably not used for data transmission. For this reason, the more the number of small cells arranged at high density is, the resource usable for data transmission is decreased in the resource for transmitting the cell detection reference signal. The frequency use efficiency in a subframe in which the cell detection reference signal is arranged thus is lowered. The more the number of small cells per macro cell is, for example, 20 to 100 cells, the more remarkable this problem becomes.

One non-limiting and exemplary embodiment provides a terminal, a base station, a transmission method, and a reception method that are capable of preventing lowering of the frequency use efficiency in a subframe in which the cell detection reference signal is arranged.

In one general aspect, the techniques disclosed here feature a terminal including a reception processor, a generator, and a transmission processor. The reception processor receives first reference signals, each of the first reference signals being transmitted from corresponding one of a plurality of cells. Each of the first reference signals is a reference signal for cell detection that is mapped to any one of a plurality of candidate resources, which are a part of a plurality of resources set for second reference signals in a subframe. The generator generates measurement information indicating a measurement result of reception quality measured using the received first reference signal. The transmission processor transmits the generated measurement information.

It should be noted that general or specific embodiments may be implemented as a system, a method, an integrated circuit, a computer program, a storage medium, or any selective combination thereof.

According to the present disclosure, lowering of the frequency use efficiency in a subframe in which the cell detection reference signal is arranged can be prevented.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7A is a diagram illustrating a CSI-RS configuration according to a second embodiment of the present disclosure (in a case of 2 antenna ports);

FIG. 7B is a diagram illustrating a CSI-RS configuration according to the second embodiment of the present disclosure (in a case of 4 antenna ports);

FIG. 7C is a diagram illustrating a CSI-RS configuration according to the second embodiment of the present disclosure (in a case of 8 antenna ports); and FIG. 8 is a diagram illustrating an example of a system configuration according to a third embodiment of the present disclosure.

DETAILED DESCRIPTION (Underlying Knowledge Forming Basis of the Present Disclosure)

Figure 1A:
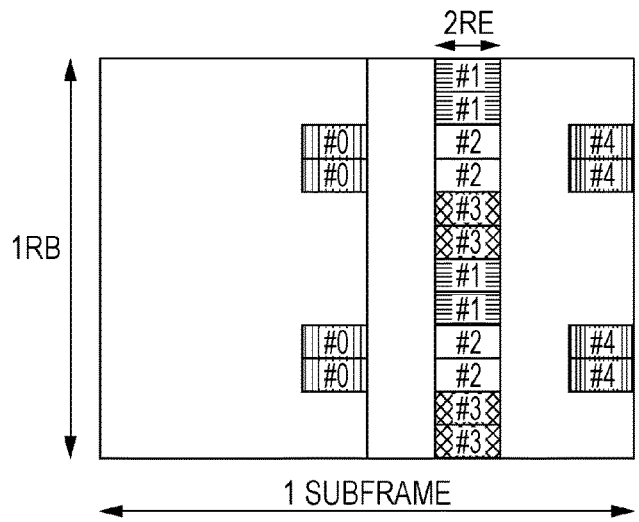
FIGS. 1A to 1C are diagrams each illustrating a configuration example of a resource in which a CSI-RS is arranged.
Figure 1B:
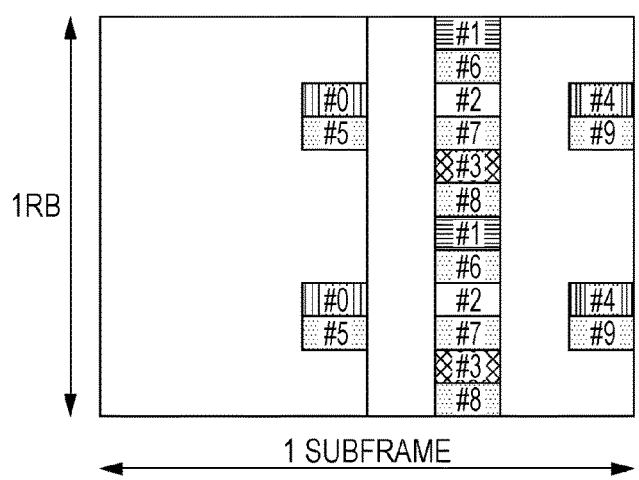
Figure 1C:
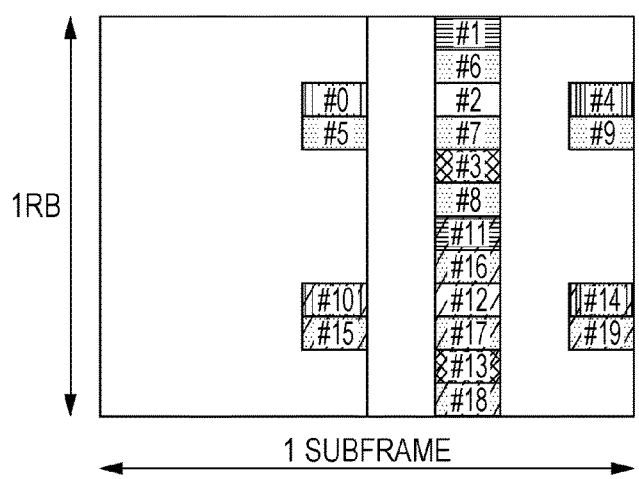

FIGS. 1A to 1C are diagrams each illustrating a configuration example of a resource in which a CSI-RS is arranged in a subframe. FIG. 1A is a configuration example with the number of antenna ports of 8 ports. FIG. 1B is a configuration example with the number of antenna ports of 4 ports. FIG. 1C is a configuration example with the number of antenna ports of 2 ports. In FIGS. 1A to 1C, one subframe is formed by two resource blocks (RB) with 12 subcarriers bundled together. Furthermore, in FIGS. 1A to 1C, #i (0 to 19) is a CSI-RS configuration number representing a resource (2 resource element (2RE)) including two orthogonal frequency division multiplexing (OFDM) symbols continuing in a time domain in each subcarrier. In each resource (2RE), CSI-RSs for two ports are code multiplexed.

Each terminal acquires in advance information on the CSI-RS from the base station through a higher layer. Specific examples of the information on the CSI-RS are cited below. A numbers of antenna ports (antennaPortsCount), a CSI-RS configuration number specifying the subcarrier in the subframe and the position of the OFDM symbol (resourceConfig: #0 to #19 in FIGS. 1A to 1C for example), a transmission subframe including a transmission cycle and an offset (subframeConfig), a power ratio of a reference signal to a data signal (p-C), and the like are cited as the examples.

In FIGS. 1A to 1C, the CSI-RS configuration numbers are assigned in the order in the time axis (horizontal axis) direction, and in the order in the frequency axis (vertical axis) direction for the same time axis. As illustrated in FIGS. 1A to 1C, among the CSI-RS configurations corresponding to each number of antenna ports, a start position of the resource of each CSI-RS configuration numbers (start position in the order of number assignment) is assigned with the same number. Furthermore, as illustrated in FIGS. 1A to 1C, a CSI-RS configuration in a case where the number of antenna ports is small forms a subset of a CSI-RS configuration in a case where the number of the antenna ports is large. With this, while using duplicated number assignment in the CSI-RS configurations corresponding to each number of antenna ports, specification of the resource for each number of antenna ports can be performed with minimum required CSI-RS configuration numbers. For example, the CSI-RS configuration number #0 for 2 ports illustrated in FIG. 1C can be specified as only resources for 2 ports (2RE) from the start point, out of the resources (8RE) represented by the CSI-RS configuration number #0 for 8 ports illustrated in FIG. 1A.

As described above, to observe channel information between each base station and the terminal to be subjected to adaptive modulation and precoding control, a procedure is taken in which the base station notifies the terminal of information on the CSI-RS in advance. When the CSI-RS is used as the cell detection reference signal, it is also possible that a network formed of a plurality of base stations notifies the terminal of predefined information in advance. For example, with information such as the above-described CSI-RS configuration number and a transmission subframe notified in advance from the network to the terminal, the terminal side can perform signal measurement for cell detection.

The applicant has found from earnest research based on the above-described knowledge that a configuration with a cell detection reference signal arranged in any of candidate resources being a part of a plurality of resources set for arranging other reference signal (for example, a CSI-RS) in the subframe in which the cell detection reference signal is arranged, can prevent lowering of the frequency use efficiency in the subframe in which the cell detection reference signal is arranged.

Embodiments according to the present disclosure will be described below in detail with reference to the drawings. It should be noted that the same components are assigned with the same reference characters and any repeated description thereof is omitted.

First Embodiment

In an LTE technique and an LTE-Advanced technique, orthogonal frequency division multiple access (OFDMA) is employed as a downlink communication method. As a transmission method of a cell detection reference signal in the OFDMA, transmitting a signal using a predetermined OFDM symbol and a predetermined subcarrier is considered.

With this, a terminal can grasp a transmission position of the signal as long as synchronization is secured between the terminal and a cell to be measured. This further enables observation of a reception signal power of the cell detection reference signal (referred to as a reference signal reception power (RSRP) in some cases) or a reception signal quality (referred to as a reference signal reception quality (RSRQ) in some cases).

On the other hand, securing a predetermined time or more during which data transmission and reception are not performed can stop the operations of a transmitter and a receiver and thereby provide a power saving effect with the terminal (discontinuous reception (DRX)). For this operation, to minimize the interval length in which the terminal needs to perform a reception operation and secure a predetermined time or more during which data transmission and reception is not performed, a configuration as described below is considered. In a configuration of the network, the reference signals for cell detection transmitted by a plurality of cells are concentratedly arranged in a predetermined subframe and the terminal can perform DRX in other subframes for a longer period of time. That is to say, more reference signals for cell detection are required to be arranged in a predetermined subframe.

[Outline of Communication System]

A communication system according to the first embodiment of the present disclosure includes a base station 100 and a terminal 200. The base station 100 is a base station corresponding to an LTE-Advanced system and the base station 200 is a terminal corresponding to an LTE-Advanced system.

Figure 2:
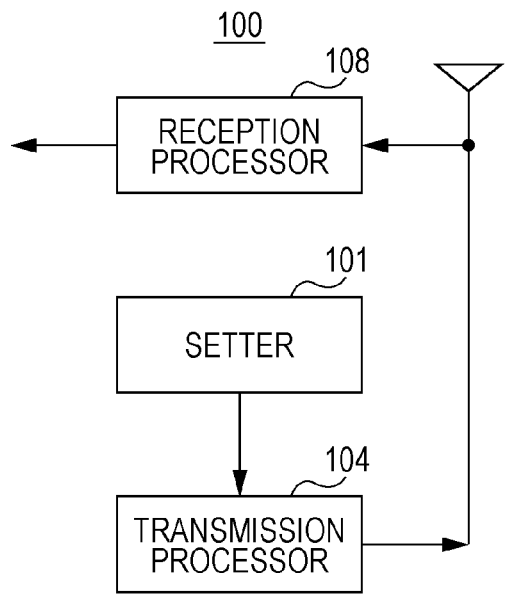
FIG. 2 is a block diagram illustrating a main configuration of a base station according to a first embodiment of the present disclosure.

FIG. 2 is a main configuration diagram of the base station 100 according to the first embodiment of the present disclosure. In the base station 100, a setter 101 sets information on a subframe in which the cell detection reference signal is arranged. A transmission processor 104 transmits the above-described information. A reception processor 108 receives an RRM report (measurement information) indicating a measurement result of reception quality (RSRP or RSRQ) measured using the cell detection reference signal.

Figure 3:
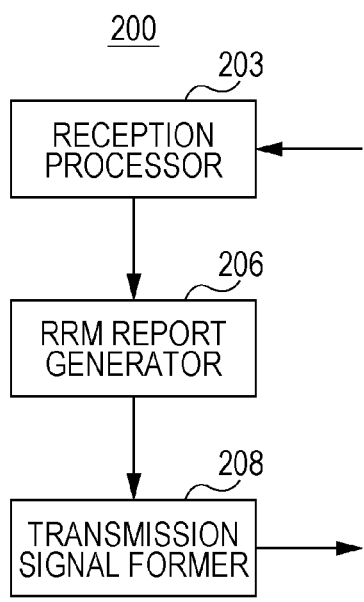
FIG. 3 is a block diagram illustrating a main configuration of a terminal according to the first embodiment of the present disclosure.

FIG. 3 is a main configuration diagram of the terminal 200 according to the first embodiment of the present disclosure. In the terminal 200, a reception processor 203 receives the cell detection reference signal. An RRM report generator 206 generates the RRM report (measurement information) indicating a measurement result of reception quality (RSRP or RSRQ) measured using the cell detection reference signal. A transmission signal former 208 transmits the RRM report.

The cell detection reference signal is arranged in any of candidate resources being a part of a plurality of resources set for arranging other reference signal (for example, a CSI-RS) in the subframe in which the cell detection reference signal is arranged.

[Configuration of Base Station 100]

Figure 4:
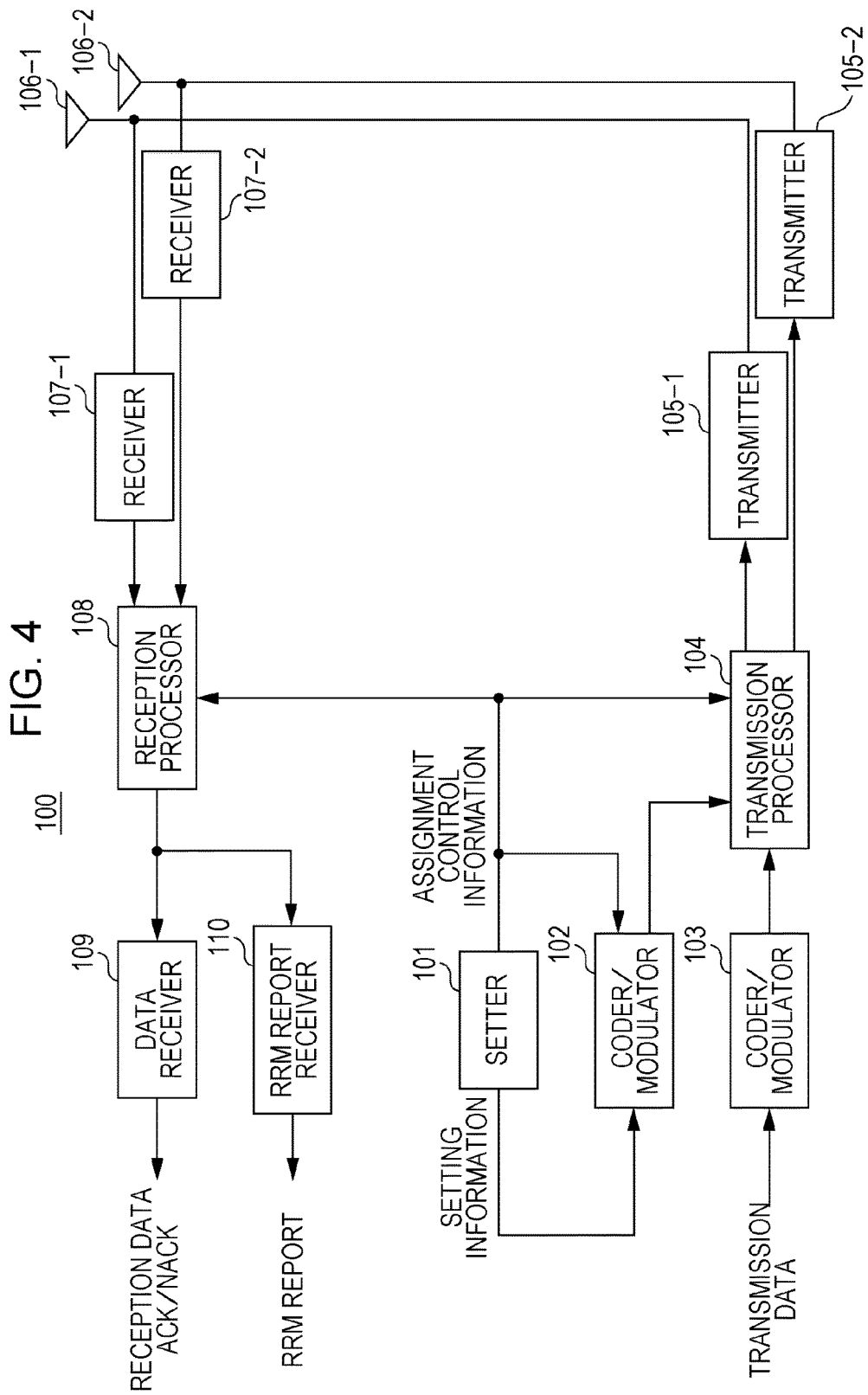
FIG. 4 is a block diagram illustrating a configuration of the base station according to the first embodiment of the present disclosure.

FIG. 4 is a block diagram illustrating a configuration of the base station 100 according to the first embodiment of the present disclosure. In FIG. 4, the base station 100 includes the setter 101, coders/modulators 102, 103, the transmission processor 104, transmitters 105-1, 105-2, antennas 106-1, 106-2, receivers 107-1, 107-2, the reception processor 108, a data receiver 109, and an RRM report receiver 110.

The setter 101 generates information on the cell detection reference signal (cell detection reference signal information) with respect to the terminal 200 to be subjected to the RRM report. The cell detection reference signal information includes transmission subframe information including a transmission cycle and an offset, for example. That is to say, the setter 101 sets a subframe in which the cell detection reference signal is arranged. The setter 101 thus sets a parameter required for measuring the reception signal power (RSRP) and the reception signal quality (RSRQ) for each cell, with respect to the terminal 200 to be subjected to the RRM report.

The cell detection reference signal information generated by the setter 101 is transmitted, as control information (setting information), to the terminal 200 to be subjected to the RRM report after receiving transmission processing in the coder/modulator 102, the transmission processor 104, and the transmitter 105. As control information for providing a notification of the cell detection reference signal information, information on radio resource control (RRC signaling) can be used.

The setter 101 generates assignment control information including resource block (RB) assignment information and information on a modulation and coding scheme (MCS) with respect to one or more transport block (TB). The assignment control information includes assignment control information on upstream resource to which uplink data is assigned (for example, physical uplink shared channel (PUSCH)) and assignment control information on downstream resource to which downlink data is assigned (for example, physical downlink shared channel (PDSCH)). The assignment control information is output to the transmission processor 104 and the reception processor 108, and at the same time, notified to the terminal 200 from the base station 100 through PDCCH.

The coder/modulator 102 codes and modulates information received from the setter 101 and outputs a modulation signal thus obtained to the transmission processor 104.

The coder/modulator 103 codes and modulates a data signal (transmission data) being input and outputs a modulation signal thus obtained to the transmission processor 104.

The transmission processor 104 forms a transmission signal by mapping the modulation signal received from the coder/modulator 102 and the coder/modulator 103 to a resource indicated by the assignment control information on downstream resource received from the setter 101. The transmission signal including the cell detection reference signal information is thus transmitted. At this time, when the transmission signal is an OFDM signal, the transmission processor 104 maps the modulation signal to the resource indicated by the assignment control information on downstream resource received from the setter 101, transforms the mapped signal into a time waveform through inverse fast Fourier transform (IFFT) processing, and adds a cyclic prefix (CP) to the converted waveform, whereby the OFDM signal is formed.

The transmitter 105-1 or 105-2 performs transmission radio processing (upconversion, digital/analog (D/A) conversion, and the like) on the transmission signal received from the transmission processor 104 and transmits the signal thus obtained through the antenna 106-1 or 106-2.

The receivers 107-1 and 107-2 perform reception radio processing (downconversion, analog/digital (A/D) conversion, and the like) on a radio signal received through the antenna 106-1 or 106-2 and output a reception signal thus obtained to the reception processor 108.

With respect to the transmitters, receivers, and antennas provided in plurality, an operation in which the transmitter 105-1, the receiver 107-1, and the antenna 106-1 are used for forming a macro cell and the transmitter 105-2, the receiver 107-2, and the antenna 106-2 are used for forming a small cell is possible, for example. Furthermore, the number of the transmitters, the receivers, and the antennas is not limited to two as illustrated in FIG. 4, and may be three or more.

The reception processor 108 specifies a resource to which an upstream data signal and ACK/NACK information are mapped based on the resource assignment control information received from the setter 101 and extracts a signal component mapped to the specified resource from the reception signal. The reception processor 108 further extracts the RRM report from the reception signal.

At this time, when the reception signal is an OFDM signal, the reception processor 108 transforms the extracted signal component into a time domain signal by performing inverse discrete Fourier transform (IDFT) processing thereon.

The upstream data signal (reception data) and the ACK/NACK information thus extracted by the reception processor 108 are output to the data receiver 109, and the RRM report is output to the RRM report receiver 110.

The data receiver 109 decodes the signal received from the reception processor 108. The uplink data and the ACK/NACK information are thus obtained.

The RRM report receiver 110 outputs the signal received from the reception processor 108 to other components (not illustrated). The base station 100 performs operations such as selection of connection cells for the terminal 200 to be subjected to the RRM report based on the received RRM report for each cell.

[Configuration of Terminal 200]

Figure 5:
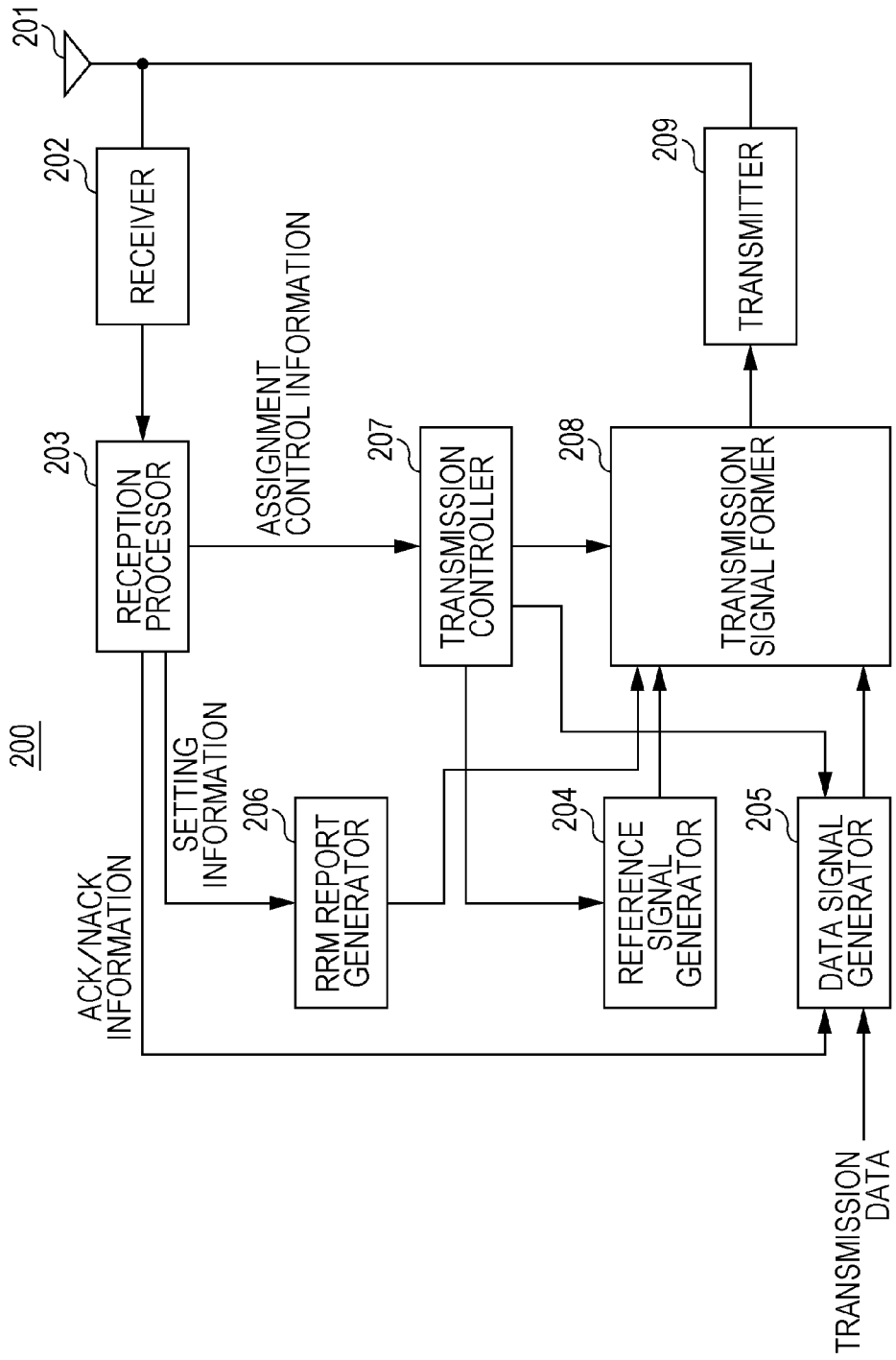
FIG. 5 is a block diagram illustrating a configuration of the terminal according to the first embodiment of the present disclosure.

FIG. 5 is a block diagram illustrating a configuration of the terminal 200 according to the first embodiment of the present disclosure.

In FIG. 5, the terminal 200 includes an antenna 201, a receiver 202, the reception processor 203, a reference signal generator 204, a data signal generator 205, the RRM report generator 206, a transmission controller 207, the transmission signal former 208, and a transmitter 209.

The receiver 202 performs reception radio processing (downconversion, analog/digital (A/D) conversion, and the like) on a radio signal received through the antenna 201 and outputs a reception signal thus obtained to the reception processor 203.

The reception processor 203 extracts setting information, assignment control information, and a data signal contained in the reception signal. The reception processor 203 outputs the assignment control information to the transmission controller 207 and outputs the setting information to the RRM report generator 206. The reception processor 203 further performs error detection processing on the extracted data signal and outputs the ACK/NACK information in accordance with a result of the error detection to the data signal generator 205.

The reception processor 203 further specifies a transmission subframe to which the cell detection reference signal is transmitted, based on the cell detection reference signal information included in the setting information. The reception processor 203 then extracts the cell detection reference signal (for example, a CSI-RS) transmitted from each cell from the reception signal in the specified transmission subframe and outputs a reception value of the cell detection reference signal to the RRM report generator 206.

Upon receiving a generation instruction from the transmission controller 207, the reference signal generator 204 generates a reference signal and outputs the generated reference signal to the transmission signal former 208.

The data signal generator 205, using the ACK/NACK information and the transmission data serving as inputs, codes and modulates the ACK/NACK information and the transmission data based on MCS information received from the transmission controller 207 to generate a data signal. It should be noted that when the reception signal is an OFDM signal, the data signal generator 205 also performs CP removal processing and FFT processing.

The RRM report generator 206 generates an RRM report using the cell detection reference signal (reception value) received from the reception processor 203. Specifically, the RRM report generator 206 uses the cell detection reference signal to measure the reception signal power (RSRP) or the reception signal quality (RSRQ) and generates the RRM report (measurement information) indicating a measurement result. The RRM report generator 206 outputs the generated RRM report to the transmission signal former 208.

The transmission controller 207 specifies a "data mapping resource" to which a data signal is mapped based on the assignment control information received from the reception processor 203 and outputs information on the data mapping resource (hereinafter, referred to as "data mapping resource information in some cases) to the transmission signal former 208, and at the same time, outputs MCS information included in the assignment control information to the data signal generator 205.

The transmission signal former 208 maps the reference signal received from the reference signal generator 204 to a mapping resource for a reference signal. The transmission signal former 208 further maps the data signal received from the data signal generator 205 to the data mapping resource indicated by the data mapping resource information. The transmission signal former 208 further maps the RRM report received from the RRM report generator 206 to a mapping resource for the RRM report. A transmission signal is thus formed. With this, a transmission signal including the RRM report is transmitted. It should be noted that when the transmission signal is an OFDM signal, the transmission signal former 208 performs discrete Fourier transform (DFT) on the data signal before mapping the data signal to the data mapping resource. Furthermore, a CP is added to the transmission signal thus formed.

The transmitter 209 performs transmission radio processing (upconversion, digital/analog (D/A) conversion, and the like) on the transmission signal formed in the transmission signal former 208 before transmitting the transmission signal through the antenna 201.

[Operation of Base Station 100 and Terminal 200]

Operations performed by the base station 100 and the terminal 200 having the above-described configurations will be described below.

In the description below, unless otherwise specified, the cell detection reference signal is to be transmitted over the entire system band in the transmission subframe of the cell detection reference signal.

Furthermore, in the description below, as an example of a resource for arranging the cell detection reference signal, a case where a part of resources set for arranging CSI-RSs is used will be described.

In the base station 100, the setter 101 generates transmission subframe information indicating the subframe for transmitting the cell detection reference signal to the terminal 200 to be subjected to the setting. The transmission subframe information includes parameters corresponding to the transmission cycle and the offset, for example. The transmission subframe information is notified from the base station 100 to the terminal 200 in advance and thereby shared between the base station 100 and the terminal 200.

The base station 100 thus notifies the terminal 200 of the information on the cell detection reference signal, and thereby causes the terminal 200 to implement the RRM report using the cell detection reference signal.

For example, the base station 100 practices a rule as described below with respect to the terminal 200, and thereby is able to obtain the RRM report from the terminal 200. For example, a rule is set up to stipulate that, at a time point in which an event occurs that has been predetermined with respect to a measurement result of the reception signal power (RSRP) or the reception signal quality (RSRQ) when the cell detection reference signal is received, the RRM report is fed back. Alternatively, a rule is set up to stipulate that measurement results for all cells exceeding predetermined reception signal power or reception signal quality are to be reported. Examples of the predetermined event will be cited below. One example is a case where a measurement result of the reception signal power or the reception signal quality when the cell detection reference signal is received from a certain cell exceeds a predetermined threshold. Another example is a case where a measurement result of the reception signal power or the reception signal quality when the cell detection reference signal is received from a certain cell is within a predetermined level difference compared with the reception signal power or the reception signal quality of a cell to which the terminal 200 belongs. Still another example is a case where a measurement result of the reception signal power or the reception signal quality when the cell detection reference signal is received from a certain cell exceeds a predetermined level difference compared with the reception signal power or the reception signal quality of a cell to which the terminal 200 belongs.

Out of a plurality of resources set for the CSI-RS (see FIGS. 1A to 1C, for example), the base station 100 and the terminal 200 use only a part of the resources that has been predetermined as the resource for the cell detection reference signal. That is to say, the cell detection reference signal transmitted from each cell is arranged in any of a plurality of resources (candidate resources) being a part of a plurality of resources set for arranging the CSI-RS.

For example, as the resources set for the CSI-RS, there are 40 resources in total that are composed by multiplication of two types of spread codes ({+1, +1}, {+1, −1}) for multiplexing two ports with each of the resources represented by the CSI RS configuration numbers and other 20 resources usable for 2-port CSI-RSs represented by the CSI-RS configuration numbers (#0 to #19 illustrated in FIG. 1C).

The base station 100 and the terminal 200 limit the resource for cell detection reference signal (candidate resource) to a part of these 40 resources. For example, the base station 100 and the terminal 200 limit the candidate resource to 10 resources with smaller CSI-RS configuration numbers (#0 to #9) out of the 20 resources represented by 20 CSI-RS configuration numbers. In this case, the base station 100 and the terminal 200 use only 20 resources in total, out of the 40 resources, including the limited 10 resources (represented by CSI-RSs #0 to #9) and the resources formed by combination with two types of spread codes, as the candidate resources for the cell detection reference signal.

The base station 100 and the terminal 200 further specifies a resource in which the cell detection reference signal transmitted from each cell is arranged based on the cell identification number (Cell ID) of each cell, out of the part of the resources (20 resources in the example above). For example, the resource for the cell detection reference signal for each cell is specified as a resource corresponding to a value ($V_{shift}$) ($V_{shift}$=0 to 19) obtained by using the cell identification number (Cell ID) to set mod(Cell ID, 20).

At this time, in an LTE technique, Cell ID is to be an optional value from 0 to 503. Furthermore, in the example above, it is assumed that $V_{shift}$=0 to 9 is respectively associated with the combination of each of the CSI-RS configuration numbers #0 to #9 and the spread code {+1, +1}, and $V_{shift}$=10 to 19 is respectively associated with the combination of each of the CSI-RS configuration numbers #0 to #9 and the spread code {+1, −1}. In this case, $V_{shift}$ for a cell having Cell ID=72 is mod(72, 20)=12. With this, the resource formed by combination of the CSI-RS configuration number #2 and the spread code {+1, −1} which corresponds to $V_{shift}$=12 is specified as the resource for cell detection reference signal for the corresponding cell. The same applies to other cell IDs.

Association as described above between the cell identification numbers and resources (resources corresponding to $V_{shift}$) is shared in advance between the base station 100 and the terminal 200.

Furthermore, the base station 100 performs rate matching of a data signal using the set transmission subframe information. Specifically, the base station 100, in the subframe indicated by the transmission subframe information, does not arrange any data in a resource for transmitting the cell detection reference signal in other cell, and arranges data in remaining resources other than the resource for transmitting the cell detection reference signal. With this, the terminal 200 can receive the cell detection reference signal without receiving any interference from data of connection cells. The terminal 200 thus can measure the reception signal power and the reception signal quality with good accuracy by using the cell detection reference signals for the surrounding cells. Furthermore, the terminal 200 can perform reception and demodulation of data without receiving any interference from the corresponding cell detection reference signal when detecting a data signal.

On the other hand, in the terminal 200, the reception processor 203 receives the cell detection reference signal from each cell in the transmission subframe indicated by the transmission subframe information included in the setting information. The RRM report generator 206 then generates the RRM report using the cell detection reference signal.

As described above, the terminal 200 uses resources for CSI-RSs as a resource in which the cell detection reference signal can be arranged, and also grasps in advance the rule with the base station 100 that only a part of the resources out of the resources for CSI-RSs is used as a resource for the cell detection reference signal. The terminal 200 thus measures only the resource for the cell detection reference signal when the terminal 200 measures the reception signal power and the reception signal quality by using the cell detection reference signal.

Furthermore, as described above, the terminal 200 grasps association between a cell identification number (Cell ID) and a resource position for the cell detection reference signal. For example, when a cell identification number and a resource are associated with each other in advance, the terminal 200 specifies the cell identification number (Cell ID) from the resource position that has been detected and observes the cell detection reference signal in the resource corresponding to the specified cell identification number. Alternatively, when the terminal 200 has received in advance the cell identification number for the cell to be measured from the network, the terminal 200 may observe the cell detection reference signal only in the resource corresponding to the CSI-RS configuration number that corresponds to that cell identification number.

The terminal 200 further receives transmission data from the base station 100 in the subframe with the cell detection reference signal arranged therein. Thereafter, when the terminal 200 performs demodulation and decoding of the transmission data, the terminal 200 acknowledges that all of the above-described part of the resources predetermined as the resource for the cell detection reference signal or the resource corresponding to the CSI-RS configuration number corresponding to the cell to be measured notified in advance is not used for data transmission. In other words, the terminal 200 performs operations of demodulation and decoding of transmission data on the assumption that the transmission data is arranged in a resource other than the resource for the above-described cell detection reference signal.

In this manner, in the present embodiment, the resource used for arranging the cell detection reference signal is to be only a part of a plurality of resources set for arranging an existing reference signal (a CSI-RS in the example in the present embodiment). This can prevent a drastic increase of the resource in which the cell detection reference signal is arranged, in a subframe for transmitting the cell detection reference signal, whereby lowering of the frequency use efficiency in a subframe in which the cell detection reference signal is arranged can be prevented.

In other words, the present embodiment can limit the resource usable for the cell detection reference signal for detecting small cells arranged at high density and avoid lowering of the frequency use efficiency at the time of data transmission. This enables detection of small cells while suppressing the lowering of the frequency use efficiency at the time of data transmission, whereby deployment of small cells at high density can be realized.

Furthermore, according to the present embodiment, it is predetermined that only a part of the resources out of the resources for an existing reference signal is used as a resource in which the cell detection reference signal is arranged. This can simplify the cell detection reference signal observing operations performed by the base station 100 and the terminal 200, and at the same time, suppress lowering of the frequency use efficiency in data transmission accompanied by transmission of the corresponding reference signal.

Furthermore, according to the present embodiment, the resource for the cell detection reference signal is specified using a cell identification number. This unnecessitates addition of signaling for specifying the resource for the cell detection reference signal.

In the present embodiment, out of 20 resources represented by the 2-port CSI-RS configuration numbers (#0 to #19), the number of the candidate resources used as the resource for the cell detection reference signal is not limited to 10 (#0 to #9) as in the above-described example, and may be other value (6, for example). Furthermore, out of 20 resources represented by the 2-port CSI-RS configuration numbers (#0 to #19), the number of the candidate resources used as the resource for the cell detection reference signal is not limited to a predetermined number counted from the smallest CSI-RS configuration number as described above. The candidate resources may be resources having even numbers or odd numbers for the CSI-RS configuration numbers thereof and may be resources represented by random CSI-RS configuration numbers, for example. Furthermore, in the present embodiment, the resource in which the cell detection reference signal is arranged is not limited to a resource usable for 2-port CSI-RSs and may be a resource usable for 4-port or 8-port CSI-RSs.

Variation A in First Embodiment

In the above-described embodiment, a case where the cell detection reference signal is transmitted over the entire system has been described. On the other hand, in a conventional LTE technique, a performance code of cell detection has been stipulated based on a minimum value possibly employed as a system bandwidth. Specifically, in a performance code of cell detection, a transmission condition is stipulated under which predetermined accuracy can be obtained in a system bandwidth of 6 RBs using 6 pieces of RBs illustrated in FIGS. 1A to 1C. That is to say, when the cell detection reference signal is transmitted using the entire band in a generally-used wide system bandwidth (for example, 50 RBs), a larger number of samples and a wider bandwidth are used than those under the transmission condition stipulated in the performance code of cell detection.

In the present variation, with the above-described point considered, an object to be the above-described part of the resources used as the resource for the cell detection reference signal is defined to be a bandwidth narrower than the system bandwidth. For example, as the resource for the cell detection reference signal, a resource (RB) that is half for the system bandwidth may be used. With this, resources other than the resource used as the resource for the cell detection reference signal can be utilized for data transmission, and the lowering of the frequency use efficiency at the time of data transmission can be further avoided in the corresponding subframe. Furthermore, in the terminal 200, the resource to be subjected to observation of the cell detection reference signal is limited, whereby an increase of the power consumption can be suppressed.

In the present variation, the resource used as the resource for the cell detection reference signal is not limited to half for the system bandwidth as long as the resource is for a bandwidth narrower than the entire system bandwidth. For example, 6 RBs described above may be set.

Furthermore, a bandwidth narrower than the system bandwidth, which has been stipulated as described above, may be used to perform frequency-domain multiplexing on the cell detection reference signals for a plurality of cells. For example, when a resource (RB) that is half for the system bandwidth is used as the resource for the cell detection reference signal, in cell A, the cell detection reference signal may be arranged in a frequency position for a low frequency with a smaller RB number. Furthermore, in cell B, the cell detection reference signal may be arranged in a frequency position for a high frequency with a larger RB number.

Furthermore, a cell identification number may be used also for specifying a frequency position in which the cell detection reference signal is arranged. For example, an integer value dividing the system bandwidth is set to $N_{freq}$ and the number of candidates used as the above-described part of the resources in which the cell detection reference signal is arranged is set to 20 resources. In this case, the frequency position in which the cell detection reference signal is arranged (the band for arranging) is specified as $mod(Cell\ ID,\ N_{freq})$, and the resource for the cell detection reference signal is specified as $mod(Cell\ ID/N_{freq},\ 20)$.

For specification of a frequency position used in the present variation, bandwidth parts determined for frequency selective CSI report can be applied. This enables a cell detection operation using an existing measurement function in the terminal 200.

In this manner, frequency-domain multiplexing of the cell detection reference signal of each cell is performed, whereby lowering of the frequency use efficiency caused by the cell detection reference signal is prevented even in a case where small cells are arranged at high density (for example, 20 to 100 pieces).

Variation B in First Embodiment

In Variation A described above, a case where a large number of samples of the cell detection reference signal is utilized for frequency-domain multiplexing has been described. In the same manner, code-domain multiplexing can be applied. That is to say, the present variation employs, as an example, a configuration in which a plurality of cell detection reference signals are arranged using a spreading sequence in the frequency direction and subjected to spread multiplexing. As the spread multiplexing in this case, for example, multiplexing performed with a different cyclic shift assigned to a Zadoff-Chu sequence used in a 3GPP LTE system is considered. For another example, a configuration is employed in which a plurality of cell detection reference signals are arranged using a spreading sequence in the time direction and subjected to spread multiplexing. As the spread multiplexing in this case, for example, multiplexing performed using a code with a different Walsh sequence used in an LTE system is considered. Furthermore, the number of codes used for the spread multiplexing of the cell detection reference signals is set to $N_{code}$ and the number of candidates used as the above-described part of the resources in which the cell detection reference signal is arranged is set to 20 resources. In this case, the resources for the cell detection reference signals are specified as mod(Cell ID/$N_{code}$, 20), and a spread code applied for the cell detection reference signal is specified as mod(Cell ID, $N_{code}$).

In this manner, code-domain multiplexing of the cell detection reference signal of each cell is performed, whereby lowering of the frequency use efficiency caused by the cell detection reference signal is prevented even in a case where small cells are arranged at high density (for example, 20 to 100 pieces).

Variation C in First Embodiment

In the embodiment described above, a case where an optional CSI-RS configuration number is used for limiting the CSI-RS resources in which the cell detection reference signal is arranged to a part of the resources has been described. By contrast, in the present variation, when the resource for the cell detection reference signal is limited, only a CSI-RS configuration number that corresponds to the resource arranged in a second slot out of the slots forming the subframe is used.

For example, in a first slot of the subframe, an operation of the transmission and reception system may be performed when the terminal 200 returns from the DRX state. By contrast, in the present variation, the resource for the cell detection reference signal is limited to the second slot, whereby the terminal 200 can perform a cell detection operation with reduced influence of instability in the transmission and reception system immediately after returning from the DRX state.

Second Embodiment

The CSI-RS is also aimed at implementing a coordinated multiple transmission point (CoMP) function seeking for performance improvement with a plurality of base stations performing coordinated operations.

Furthermore, for the terminal to observe with good accuracy a reference signal (CSI-RS) transmitted from a transmission point (TP) that belongs to a plurality of base stations performing coordinated operations in the CoMP, a muting method is also provided, with which data at the TP, to which the corresponding terminal is connected, is a non-transmission signal.

Specifically, out of the CSI-RS configuration numbers described above, each of the CSI-RS configuration numbers #0 to #9 (see FIG. 1B) corresponding to 4 ports is written in bitmap format. A mechanism is then arranged by which the terminal is notified from the base station of the resource with which the CSI-RS is a non-transmission signal (non-transmission signal resource). Information in bitmap format indicating which resource is the non-transmission signal resource is referred to as a non-transmission CSI-RS configuration number list (zeroTxPowerResourceConfigList).

As an example, out of 10 resources represented by 4-port CSI-RS configuration numbers (resourceConfig) #0 to #9, it is assumed that 2 resources represented by the CSI-RS configuration numbers #1 and #2 are non-transmission signal resources. In this case, the non-transmission CSI-RS configuration number list is {0, 1, 1, 0, 0, 0, 0, 0, 0, 0}. Here, in the order from the head bit of the non-transmission CSI-RS configuration number list, each bit corresponds to the CSI-RS configuration numbers #0 to #9. "1" represents a non-transmission signal resource, and "0" represents a resource other than the non-transmission signal resource.

Figure 6:
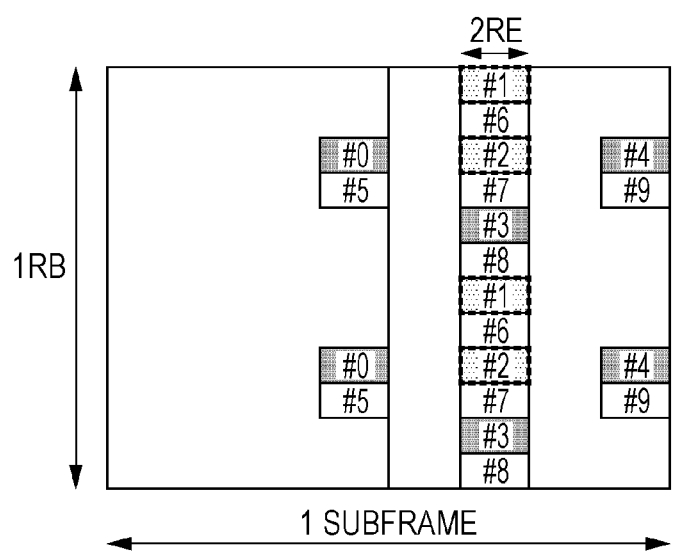
FIG. 6 is a diagram illustrating a setting example of a non-transmission signal resource.

The base station provides a notification of a transmission subframe (zeroTxPowerSubframeConfig) including a transmission cycle and an offset together with the above-described CSI-RSs in the non-transmission CSI-RS configuration number list. With this, the terminal can specify which resource is the non-transmission signal resource in the corresponding subframe. FIG. 6 illustrates a position (resource surrounded by a dotted line) of a non-transmission signal resource in a subframe corresponding to the non-transmission CSI-RS configuration number list (the above-described example: {0, 1, 1, 0, 0, 0, 0, 0, 0, 0}) set to a transmission point to which a certain terminal is connected. The CSI-RS configuration of a transmission point positioned in the periphery of the above-described transmission point (referred to as a peripheral TP) is associated with any of the non-transmission signal resources (in FIG. 6, the CSI-RS configuration numbers #1 and #2), whereby the terminal is not interfered with data from the transmission point connected thereto when observing a signal of the corresponding peripheral TP as a desired signal. This enables improvement in measurement accuracy of CSIs in the terminal.

In the same manner, when the CSI-RSs are used as the cell detection reference signals also, a muting method can be applied to implement detection of the cell detection reference signals from a plurality of cells with good accuracy.

In the present embodiment, signaling of the non-transmission signal resource described above (zeroTxPowerResourceConfigList) is utilized to provide a notification of the resource for the cell detection reference signal. That is to say, in the present embodiment, out of the CSI-RS configurations for each number of ports illustrated in FIGS. 7A to 7C, the CSI-RS configuration number for 4 ports (resourceConfig, FIG. 7B) in which signaling of a non-transmission signal resource is stipulated is used to provide a notification of the resource for the cell detection reference signal.

The basic configurations of the base station and the terminal according to the present embodiment are common with the base station 100 and the terminal 200 according to the first embodiment. For this reason, FIGS. 4 and 5 are used for the description of the base station and the terminal according to the present embodiment.

The base station 100 according to the present embodiment generates transmission subframe information indicating a subframe for transmitting the cell detection reference signal with respect to the terminal 200 to be set, in the same manner in the first embodiment.

Furthermore, the base station 100 uses only a preset part of the resources out of the resources in which the cell detection reference signal can be arranged, as a resource for the cell detection reference signal. Specifically, the base station 100 uses a resource set as a non-transmission signal resource out of the resources for CSI-RSs as a resource for the cell detection reference signal. The non-transmission CSI-RS configuration number list is notified from the base station 100 to the terminal 200.

On the other hand, the terminal 200 (reception processor 203) receives the non-transmission CSI-RS configuration number list indicating the non-transmission signal resource for setting a CSI-RS to non-transmission at the base station (transmission point) to which the terminal 200 is connected, out of a plurality of resources for CSI-RSs. The terminal 200 uses a resource indicated in the non-transmission CSI-RS configuration number list described above out of the resources for CSI-RSs as a resource for the cell detection reference signal. In other words, in the present embodiment, out of a plurality of resources for CSI-RSs, a candidate resource for arranging the cell detection reference signal is a resource for setting a CSI-RS indicated in the non-transmission CSI-RS configuration number list to non-transmission.

For example, out of 10 CSI-RS configuration numbers (#0 to #9 illustrated in FIG. 1B, a part surrounded by a bold line illustrated in FIG. 7B), which can be used as resources for 4-port CSI-RSs, it is assumed that the CSI-RS configuration numbers #0, #1, and #4 are set to non-transmission signal resources. In this case, the non-transmission CSI-RS configuration number list (zeroTxPowerResourceConfigList) is {1, 1, 0, 0, 1, 0, 0, 0, 0, 0}.

In this case, the base station 100 and the terminal 200 use any of resources formed by combination of 3 resources set to the non-transmission signal resources (CSI-RS configuration numbers #0, #1, and #4) and 2 types of spread codes multiplexing 2 ports ({+1, +1}, {+1, −1}) as the resource for the cell detection reference signal.

The port numbers 0 to 7 illustrated in FIGS. 7A to 7C correspond to CSI-RS port numbers 15 to 22 respectively. For example, the port numbers 0 and 2 (the CSI-RS port numbers 15 and 17) correspond to the spread code {+1, +1}, and the port numbers 1 and 3 (the CSI-RS port numbers 16 and 18) correspond to the spread code {+1, −1}.

As an example, the base station 100 and the terminal 200 use only 6 resources corresponding to the port numbers 0 and 2 (that is, the CSI-RS port numbers 15 and 17) of the CSI-RS configuration numbers (resourceConfig) #0, #1, and #4 illustrated in FIG. 7B (in other words, resources corresponding to the spread code {+1, +1}; resources surrounded by dotted frames illustrated in FIG. 7B) as the resources for the cell detection reference signal.

In FIG. 7B, $V_{shift}=0$ is associated with the combination of the CSI-RS configuration number #0 and the port number 0, and $V_{shift}=1$ is associated with the combination of the CSI-RS configuration number #0 and the port number 2. In the same manner, $V_{shift}=2$ is associated with the combination of the CSI-RS configuration number #1 and the port number 0, and $V_{shift}=3$ is associated with the combination of the CSI-RS configuration number #1 and the port number 2. Furthermore, $V_{shift}=4$ is associated with the combination of the CSI-RS configuration number #4 and the port number 0, and $V_{shift}=5$ is associated with the combination of the CSI-RS configuration number #4 and the port number 2. The above-described association between $V_{shift}$ and each resource is grasped by the base station 100 and the terminal 200 in advance.

In this case, the terminal 200 specifies a resource corresponding to $V_{shift}$ obtained by using a cell identification number (Cell ID) to set 2*mod(Cell ID/2, 3)+mod(Cell ID, 2) as the resource for the cell detection reference signal. It should be noted that in the function in the above-described formula, "Cell ID/2" represents a value obtained by rounding down the decimal places of a value obtained by dividing the Cell ID by 2. As an example, $V_{shift}$ obtained by setting 2*mod(36, 3)+mod(72, 2) to a cell having Cell ID=72 is 0, and a resource formed by combination of the CSI-RS configuration number #0 and the port number 0, which correspond to $V_{shift}=0$, is specified as the resource for cell detection reference signal of the corresponding cell. As another example, $V_{shift}$ obtained by setting 2*mod(36, 3)+mod(73, 2) to a cell having Cell ID=73 is 1, and a resource formed by combination of the CSI-RS configuration number #0 and the port number 2, which correspond to $V_{shift}=1$, is specified as the resource for cell detection reference signal of the corresponding cell. In the same manner, $V_{shift}$ obtained by setting 2*mod(37, 3)+mod(74, 2) to a cell having Cell ID=74 is 2, and a resource formed by combination of the CSI-RS configuration number #1 and the port number 0, which correspond to $V_{shift}=2$, is specified as the resource for cell detection reference signal of the corresponding cell. The same applies to other cell IDs.

In the description above, a structure for representing a resource for the cell detection reference signal uses the port numbers 0 and 2 (CSI-RS ports 15 and 17), that is, the spread code {+1, +1}. However, the structure is not limited thereto, and may be a structure using the port number 1 and 3 (CSI-RS ports 16 and 18), that is, the spread code {+1, −1} or may be a structure using the spread code {+1, +1} and the spread code {+1, −1} in combination.

Furthermore, the terminal 200 may specify a resource corresponding to $V_{shift}$ obtained by using a cell identification number (Cell ID) to set mod(Cell ID, 6) instead of 2*mod(Cell ID/2, 3)+mod(Cell ID, 2) as the resource for the cell detection reference signal.

In this manner, in the present embodiment, an existing non-transmission signal resource signaling is used to provide a notification of a part of the CSI-RS resources used as the resource for the cell detection reference signal. That is to say, notification of the resource for the cell detection reference signal can be bitmap notification of the CSI-RS configuration number for the 4-port CSI-RS in the non-transmission CSI-RS configuration number list for providing a notification of the resource with a non-transmission signal for data transmission in a subframe for transmitting the cell detection reference signal.

This configuration according to the present embodiment uses an existing non-transmission signal resource signaling to provide a notification of the resource for the cell detection reference signal from the base station 100 to the terminal 200, whereby addition of new signaling for providing a notification of the resource for the cell detection reference signal is unnecessitated.

Furthermore, according to the present embodiment, the resource for the cell detection reference signal is limited to a resource notified as a non-transmission signal resource, out of a plurality of resources set to the CSI-RSs. This can prevent a drastic increase of the resource in which the cell detection reference signal is arranged and thereby prevent lowering of the frequency use efficiency in the corresponding subframe. That is to say, the present embodiment enables prevention of the lowering of the frequency use efficiency in a subframe in which the cell detection reference signal is arranged, as in the first embodiment.

Third Embodiment

In the present embodiment, a case where CoMP control is performed will be described.

The basic configurations of the base station and the terminal according to the present embodiment are common with the base station 100 and the terminal 200 according to the first embodiment. For this reason, FIGS. 4 and 5 are used for the description of the base station and the terminal according to the present embodiment.

FIG. 8 illustrates a transmission point to be subjected to CoMP control (referred to as a CoMP measurement set in some cases) and the terminal 200. In FIG. 8, a configuration is employed in which coordinated transmission and reception with respect to the terminal is supported by a macro eNB (macro cell) and LPNs 1 to 3 (small cells). That is to say, the terminal 200 (reception processor 203) receives a data signal transmitted through a coordinated operation of a plurality of transmission points (the macro eNB and the LPNs 1 to 3). Furthermore, in FIG. 8, the terminal 200 is connected to the LPN1.

As illustrated in FIG. 8, the macro eNB and the LPNs 1 to 3 transmit cell detection reference signals to the terminal 200. The terminal 200 generates an RRM report using the cell detection reference signals received from each cell and feeds back the generated RRM report to the network through the LPN1 connected thereto.

A method of specifying the resource for a cell detection reference signal according to the present embodiment will be described below.

In the description below, as an example, a case where a resource for a CSI-RS is used as the resource for a cell detection reference signal will be described.

Furthermore, in the description below, a transmission point to be subjected to CoMP control is assigned with the same cell identification number (Cell ID) (in FIG. 8, Cell ID: A) and a transmission point identification number (TP ID) different from each other is set (in FIG. 8, TP ID: X, Y, Z, W).

Furthermore, similarly to the first embodiment, as the resources set for the CSI-RS, 40 resources in total, that are composed by multiplication of two types of spread codes ({+1, +1}, {+1, −1}) for multiplexing two ports with each of the resources represented by the CSI RS configuration numbers and other 20 resources usable for 2-port CSI-RSs represented by the CSI-RS configuration numbers (#0 to #19 illustrated in FIG. 1C), are used. In this case, only 20 resources in total that include the CSI-RSs #0 to #9 and the resources formed by combination with two types of spread codes are used as the resources for the cell detection reference signal (candidate resources), as in the first embodiment.

In this case, the base station 100 and the terminal 200 specify resources in each of which the cell detection reference signal transmitted from each transmission point is arranged, based on the cell identification number (Cell ID) and the transmission point identification number (TP ID) for each transmission point, out of the resources for the cell detection reference signal (candidate resources). For example, the resource for the cell detection reference signal for each of the transmission points is specified as a resource corresponding to a value ($V_{shift}$) ($V_{shift}$=0 to 19) obtained by using the cell identification number and the transmission point identification number to set mod(4*mod(Cell ID, 20)+mod(TP ID, 4), 20).

For example, as in the first embodiment, it is assumed that $V_{shift}$=0 to 9 is respectively associated with the combination of each of the CSI-RS configuration numbers #0 to #9 and the spread code {+1, +1}, and $V_{shift}$=10 to 19 is respectively associated with the combination of each of the CSI-RS configuration numbers #0 to #9 and the spread code {+1, −1}. Furthermore, for example, in FIG. 8, it is assumed that Cell ID: A=72, TP ID: X=0, Y=1, Z=2, W=3. In this case, the terminal 200, as a position of the resource for the cell detection reference signal, specifies a resource corresponding to $V_{shift}$=mod(4*12+0, 20)=8 with respect to the macro eNB, specifies a resource corresponding to $V_{shift}$=mod(4*12+1, 20)=9 with respect to the LPN1, specifies a resource corresponding to $V_{shift}$=mod(4*12+2, 20)=10 with respect to the LPN2, and specifies a resource corresponding to $V_{shift}$=mod(4*12+3, 20)=11 with respect to the LPN3.

In the same manner, in FIG. 8, it is assumed that Cell ID: A=73, TP ID: X=0, Y=1, Z=2, W=3. In this case, the base station 100 and the terminal 200, as a position of the resource for the cell detection reference signal, specifies a resource corresponding to $V_{shift}$=mod(4*13+0, 20)=12 with respect to the macro eNB, specifies a resource corresponding to $V_{shift}$=mod(4*13+1, 20)=13 with respect to the LPN1, specifies a resource corresponding to $V_{shift}$=mod(4*13+2, 20)=14 with respect to the LPN2, and specifies a resource corresponding to $V_{shift}$=mod(4*13+3, 20)=15 with respect to the LPN3.

In this manner, the resource for the cell detection reference signal transmitted from each cell is uniquely specified based on the Cell ID and the TP ID.

The base station 100 arranges the cell detection reference signal in a resource position specified in the above-described manner from each transmission point to transmit a transmission signal.

The terminal 200 uses a cell identification number separately acquired and attempts a measurement operation for the cell detection reference signal in the resource corresponding to the candidate transmission point that is possible, and thereby specifies the transmission point that has transmitted the corresponding signal. The terminal 200 then measures the reception signal power and the reception signal quality of the cell detection reference signal transmitted from the specified transmission point and reports the measured reception signal power and reception signal quality to the base station 100 as an RRM report.

In this manner, according to the present embodiment, the base station 100 and the terminal 200 specify a position of the resource for the cell detection reference signal using both cell identification number and transmission point identification number when coordinated transmission is performed. With this, even when coordinated transmission is performed, lowering of the frequency use efficiency can be prevented in a subframe for transmitting the cell detection reference signal as in the first embodiment, and at the same time, the resource corresponding to each transmission point can be specified in the terminal 200.

Each of the embodiments according to the present disclosure has been described above.

Other Embodiment

In each of the embodiments described above, a case has been described where a part of a plurality of resources for arranging the CSI-RSs is used as a resource for arranging the cell detection reference signal. That is to say, by using a part of the resources for the CSI-RSs as a resource for the cell detection reference signal, a number of candidates equal to that of existing RRM signals can be secured by using a part of the resources that can be set to the CSI-RSs. However, the reference signal resource for arranging the cell detection reference signal is not limited to the resource for the CSI-RS. For example, a PRS may be used as the cell detection reference signal. That is to say, by using a resource for the PRS as the resource for the cell detection reference signal, a signal pattern of the PRS which is excellent in frequency synchronization and timing synchronization can be used as the cell detection reference signal. The terminal 200 can then detect a plurality of cells using a specified resource. Alternatively, a reduced PSS/SSS+CRS may be used as the cell detection reference signal.

In each of the embodiments described above, an antenna port indicates a logical antenna including one or a plurality of physical antennas. That is to say, an antenna port does not necessarily indicate one physical antenna and may indicate an array antenna including a plurality of antennas, for example.

For example, in a 3GPP LTE system, the number of physical antennas forming an antenna port is not stipulated and an antenna port is only stipulated as a minimum unit that a base station can transmit different reference signals.

Furthermore, an antenna port may be stipulated as a minimum unit for multiplying the weighting of precoding vector.

In each of the embodiments described above, a case where the embodiment of the present disclosure is configured by hardware has been described as an example. However, the embodiment of the present disclosure can be implemented by software in cooperation with hardware.

Furthermore, each of the functional blocks used in the description of the embodiments is typically implemented as an LSI being an integrated circuit. Each of the functional blocks may be made into one chip individually, or a part or all of the functional blocks may be made into one chip. Although an LSI is herein assumed, the LSI may be referred to as an IC, a system LSI, a super LSI, and an ultra LSI, depending on the difference in the degree of integration.

Furthermore, the method of circuit integration is not limited to using an LSI, and a dedicated circuit or a general purpose processor may be used. A field programmable gate array (FPGA) which is programmable after manufacturing of an LSI or a reconfigurable processor of which the connection of circuit cells inside and the settings are reconfigurable may be used.

Furthermore, when a technique of circuit integration replacing an LSI appears due to the progress of the semiconductor technology or another technology derived therefrom, the technique naturally may be used for integration of the functional block. Application of biotechnology, for example, is possible.

The terminal according to the present disclosure includes a reception processor, a generator, and a transmission processor. The reception processor receives first reference signals, each of the first reference signals being transmitted from corresponding one of a plurality of cells and being a reference signal for cell detection that is mapped to any one of a plurality of candidate resources, which are a part of a plurality of resources set for second reference signals in a subframe. The generator generates measurement information indicating a measurement result of reception quality measured using the received first reference signals. The transmission processor transmits the generated measurement information.

In the terminal according to the present disclosure, the reception processor specifies resources to which the first reference signals transmitted from the plurality of cells are mapped, among the plurality of candidate resources, based on a cell identification number of each of the plurality of cells.

In the terminal according to the present disclosure, the reception processor further receives control information indicating non-transmission resources on which the second reference signals tare not to be transmitted by a base station connected with the terminal, among the plurality of resources set for the second reference signals. The plurality of candidate resources are the non-transmission resources indicated by the control information.

In the terminal according to the present disclosure, the reception processor further receives a data signal transmitted through coordinated transmission by a plurality of transmission points and, based on a cell identification number and a transmission point identification number of each of the plurality of transmission points, specifies the resources to which the first reference signals transmitted from each of the plurality of transmission points are mapped, out of the plurality of candidate resources.

In the terminal according to the present disclosure, the second reference signals are reference signals for measuring channel information.

In the terminal according to the present disclosure, the second reference signals are reference signals for measuring a position of the terminal.

The base station according to the present disclosure includes a setting circuitry, a transmission processor, and a reception processor. The setting circuitry sets a subframe to which first cell detection reference signals are mapped. Each of the first reference signals are mapped to any one of a plurality of candidate resources, which are a part of a plurality of resources set for second reference signals in the subframe. The transmission processor transmits subframe information indicating the subframe. The reception processor receives measurement information indicating a measurement result of reception quality measured using the first reference signals.

A transmission method according to the present disclosure includes receiving, generating, and transmitting. The receiving receives first reference signals, each of the first reference signals being transmitted from corresponding one of a plurality of cells. The first reference signals are reference signal for cell detection that is mapped to any of a plurality of candidate resources, which are a part of a plurality of resources set for second reference signals in to subframe. The generating generates measurement information indicating a measurement result of reception quality measured using the received first reference signal. The transmitting transmits the measurement information.

A reception method according to the present disclosure includes setting, transmitting, and receiving. The setting sets a subframe to which first reference signals are mapped. Each of the first reference signals are mapped to any one of a plurality of candidate resources, which are a part of a plurality of resources set for second reference signals in the subframe. The transmitting transmits subframe information indicating the subframe. The receiving receives measurement information indicating a measurement result of reception quality measured using the first reference signals.

The present disclosure is useful for a mobile communication system and the like.

What is claimed is:

1. A terminal comprising:
a reception processor that receives first reference signals, each of the first reference signals being transmitted from corresponding one of a plurality of cells and being a reference signal for cell detection, wherein a plurality of candidate resources, to which the first reference signals may be mapped, are a part of a plurality of resources set for second reference signals in a subframe;
a generator that generates measurement information indicating a measurement result of reception quality measured using the received first reference signals; and
a transmission processor that transmits the generated measurement information.

2. The terminal according to claim 1, wherein
the reception processor specifies resources to which the first reference signals transmitted from the plurality of cells are mapped, among the plurality of candidate resources, based on a cell identification number of each of the plurality of cells.

3. The terminal according to claim 1, wherein
the reception processor further receives control information indicating non-transmission resources on which the second reference signals are not to be transmitted by a base station connected with the terminal, among the plurality of resources set for the second reference signals, and
the plurality of candidate resources are the non-transmission resources indicated by the control information.

4. The terminal according to claim 1, wherein
the reception processor
further receives a data signal transmitted through coordinated transmission by a plurality of transmission points, and
based on a cell identification number and a transmission point identification number of each of the plurality of transmission points, specifies resources to which the first reference signals transmitted from the plurality of transmission points are mapped, out of the plurality of candidate resources.

5. The terminal according to claim 1, wherein
the second reference signals are reference signals for measuring channel information.

6. The terminal according to claim 1, wherein
the second reference signals are reference signals for measuring a position of the terminal.

7. A base station comprising:
a setting circuitry that sets a subframe to which first reference signals are mapped, each of the first reference signals being mapped to any one of a plurality of candidate resources in the subframe, wherein the plurality of candidate resources, to which the first reference signals may be mapped, are a part of a plurality of resources set for second reference signals in the subframe;
a transmission processor that transmits subframe information indicating the subframe; and
a reception processor that receives measurement information indicating a measurement result of reception quality measured using the first reference signals.

8. A transmission method comprising:
receiving first reference signals, each of the first reference signals being transmitted from corresponding one of a plurality of cells and being a reference signal for cell detection, wherein a plurality of candidate resources, to which the first reference signals may be mapped, are a part of a plurality of resources set for second reference signals in a subframe;
generating measurement information indicating a measurement result of reception quality measured using the received first reference signal; and
transmitting the generated measurement information.

9. A reception method comprising:
setting a subframe to which first reference signals are mapped, each of the first reference signals being mapped to any one of a plurality of candidate resources in the subframe, wherein the plurality of candidate resources, to which the first reference signals may be mapped, are a part of a plurality of resources set for a second reference signals in the subframe;
transmitting subframe information indicating the subframe; and receiving measurement information indicating a measurement result of reception quality measured using the first reference signals.

10. The transmission method according to claim 8, comprising:
determining resources to which the first reference signals transmitted from the plurality of cells are mapped, among the plurality of candidate resources, based on a cell identification number of each of the plurality of cells.

11. The transmission method according to claim 8, comprising:
receiving control information indicating non-transmission resources on which the second reference signals are not to be transmitted by a base station connected with the terminal, among the plurality of resources set for the second reference signals, and
determining the plurality of candidate resources as the non-transmission resources indicated by the control information.

12. The transmission method according to claim 8, comprising:
receiving a data signal transmitted through coordinated transmission by a plurality of transmission points, and
based on a cell identification number and a transmission point identification number of each of the plurality of transmission points, determining resources to which the first reference signals transmitted from the plurality of transmission points are mapped, out of the plurality of candidate resources.

13. The transmission method according to claim 8, wherein
the second reference signals are reference signals for measuring channel information.

14. The transmission method according to claim 8, wherein the second reference signals are reference signals for measuring a position of the terminal.

* * * * *